March 11, 1930.   G. R. WOOD   1,750,207
RECORDING SCALE
Filed March 16, 1922   12 Sheets-Sheet 1

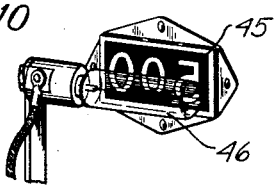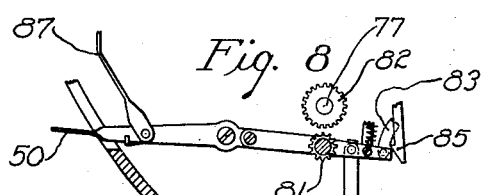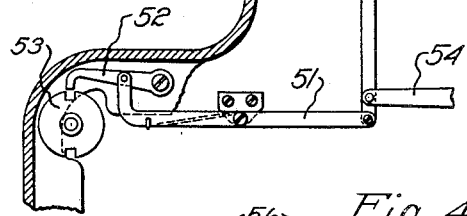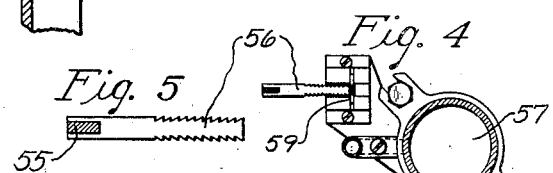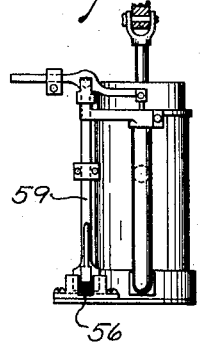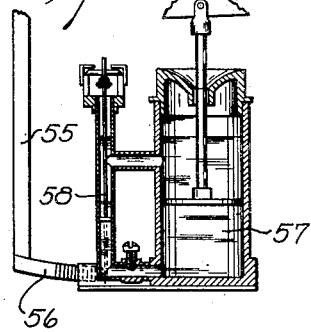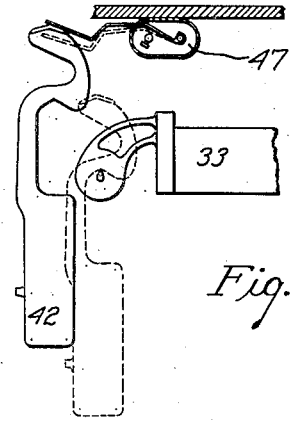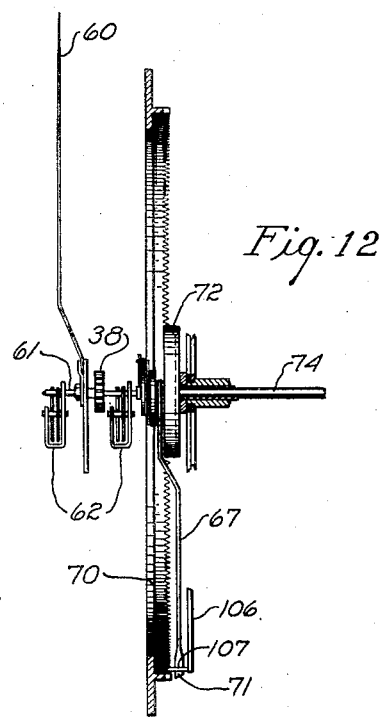

March 11, 1930.  G. R. WOOD  1,750,207
RECORDING SCALE
Filed March 16, 1922   12 Sheets-Sheet 5
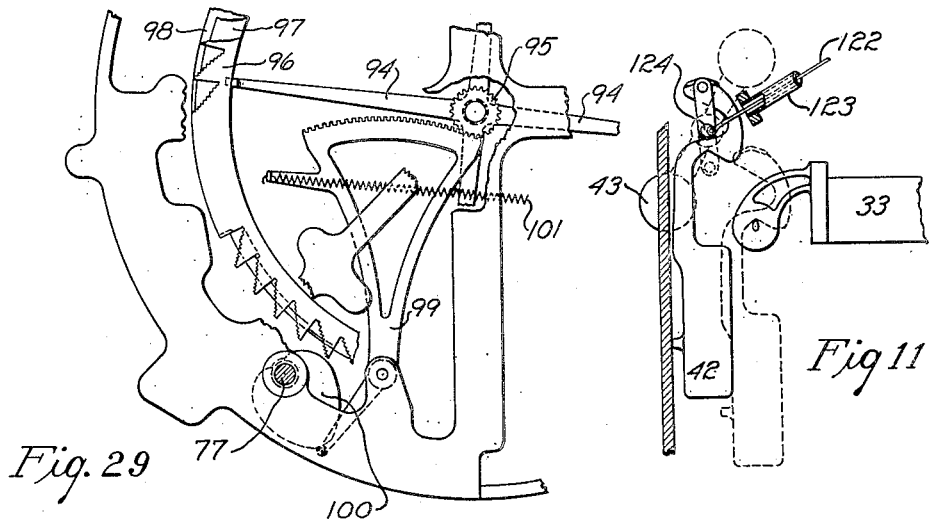
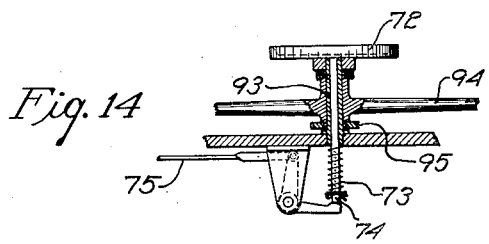
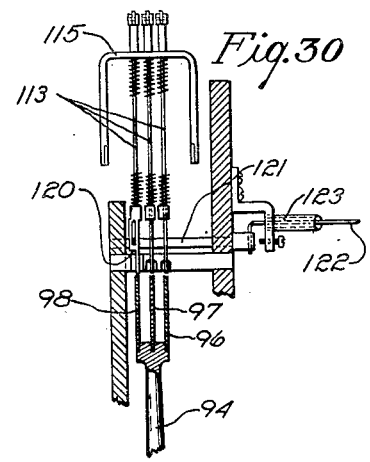
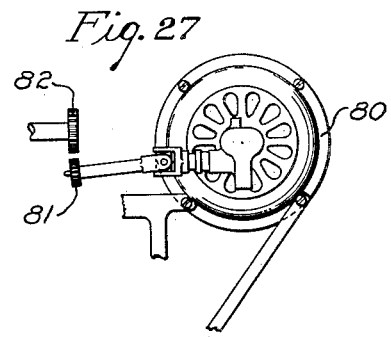
INVENTOR
George R. Wood
BY Cooper, Kerr & Dunham
his ATTORNEYS March 11, 1930.  G. R. WOOD  1,750,207
RECORDING SCALE
Filed March 16, 1922   12 Sheets-Sheet 6

INVENTOR
George R. Wood
BY Cooper, Kerr & Dunham
his ATTORNEYS

March 11, 1930.  G. R. WOOD  1,750,207
RECORDING SCALE
Filed March 16, 1922  12 Sheets-Sheet 7
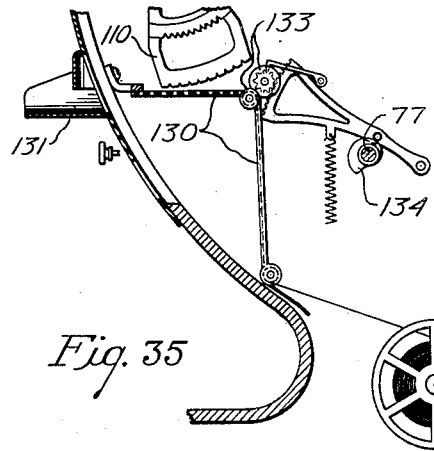
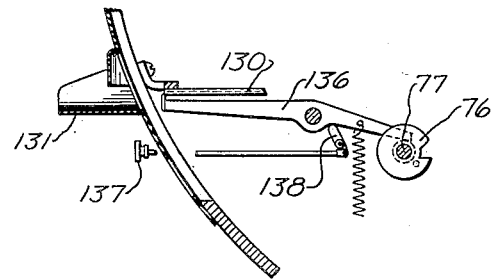
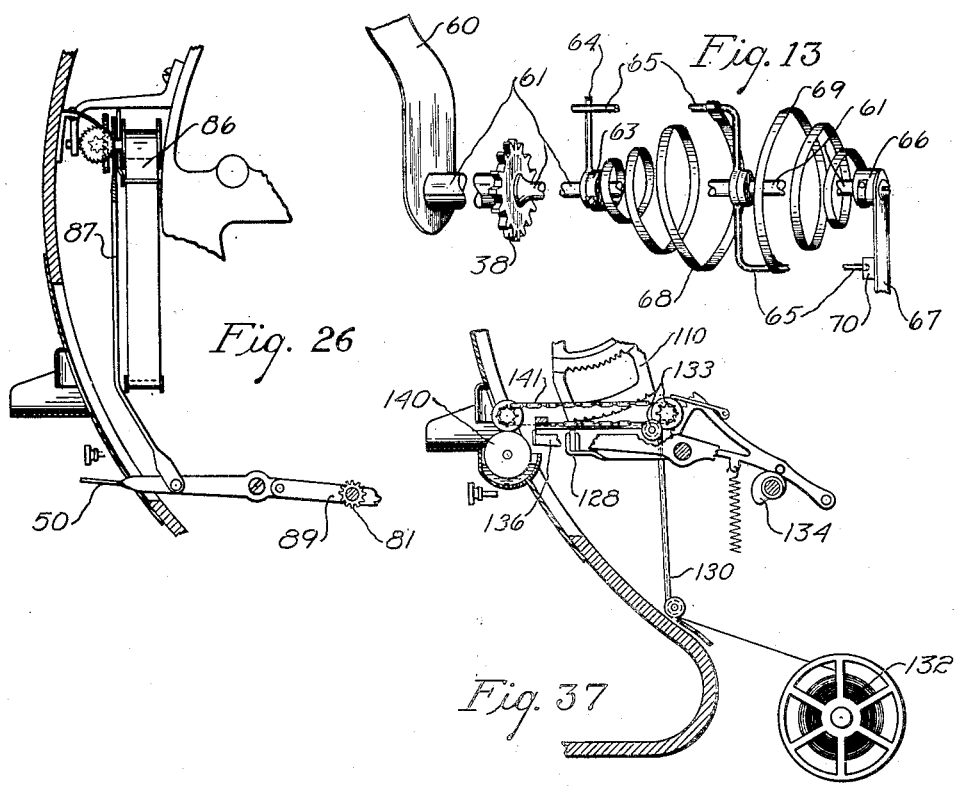
INVENTOR
George R. Wood
BY Cooper, Kerr + Dunham
his ATTORNEYS

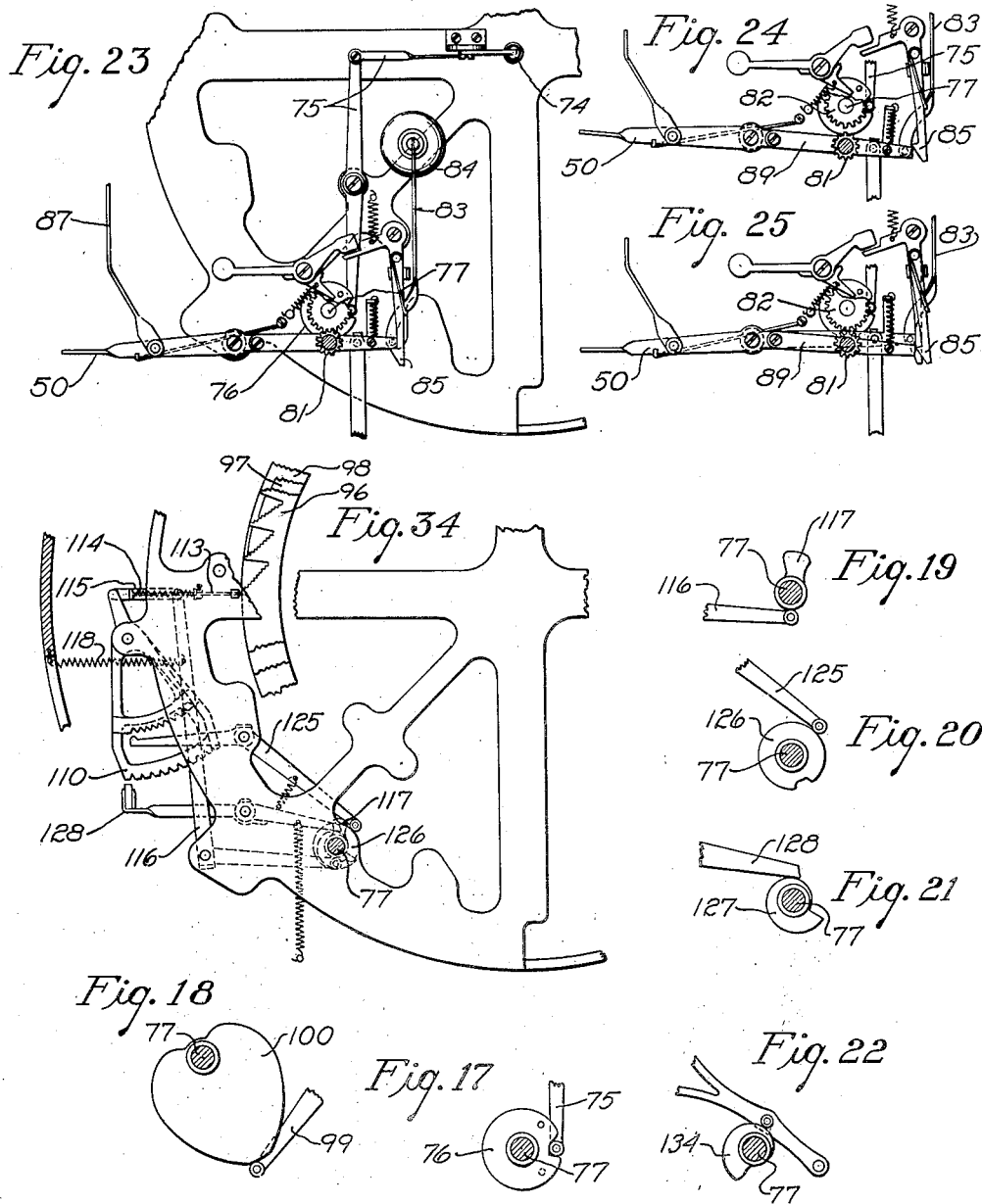

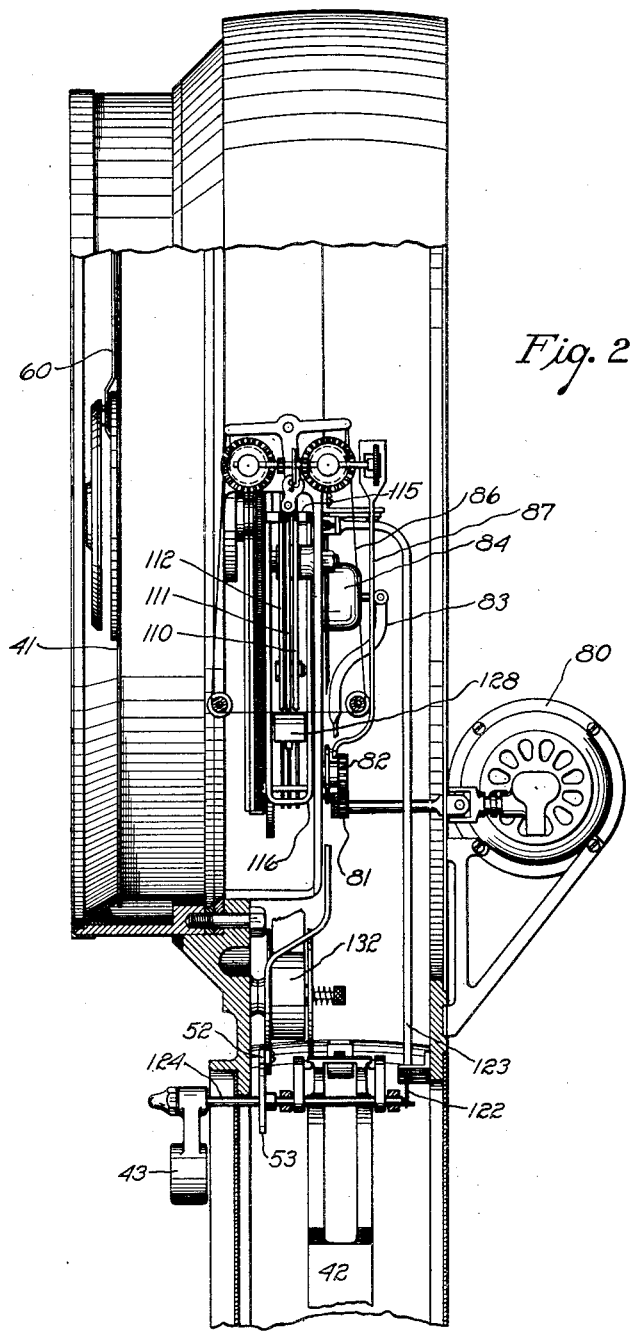

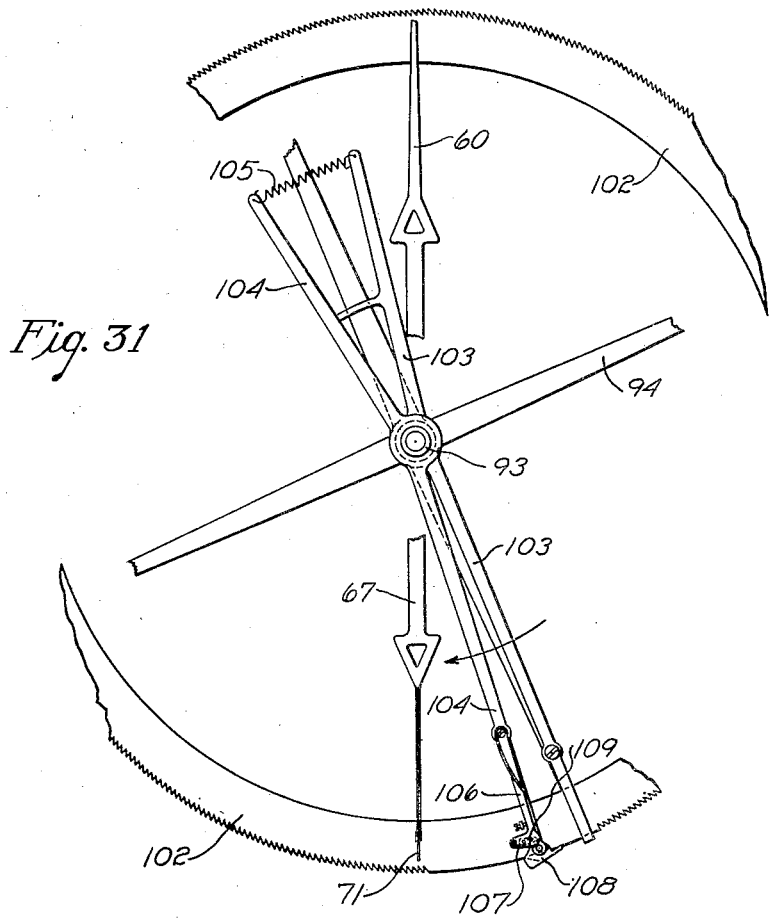
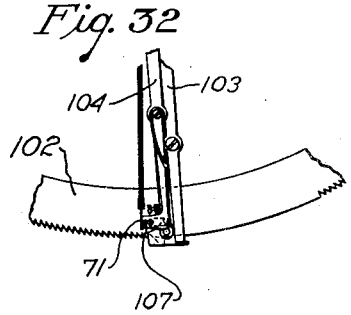
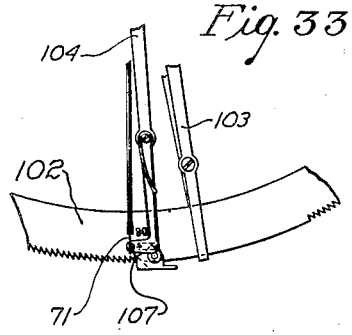

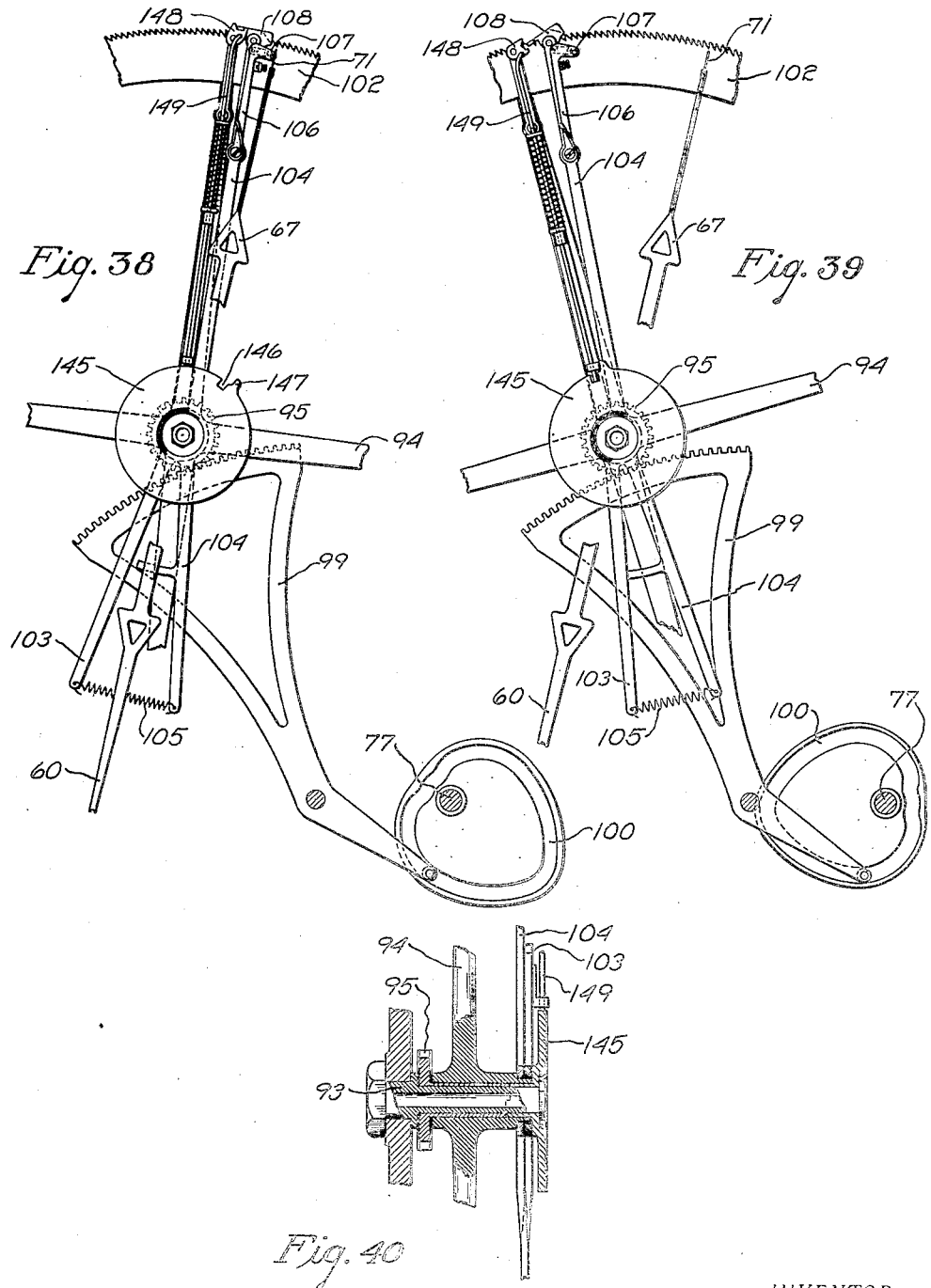

March 11, 1930.  G. R. WOOD  1,750,207
RECORDING SCALE
Filed March 16, 1922   12 Sheets-Sheet 12
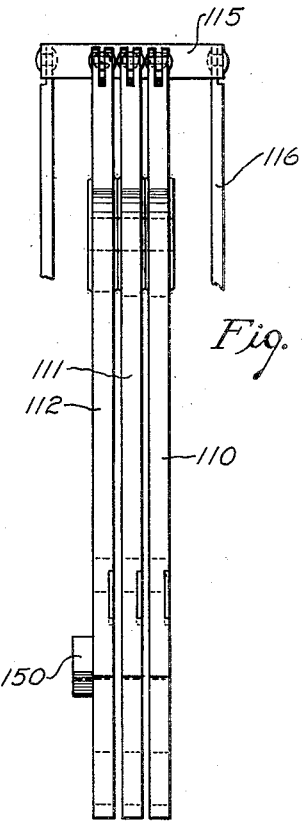
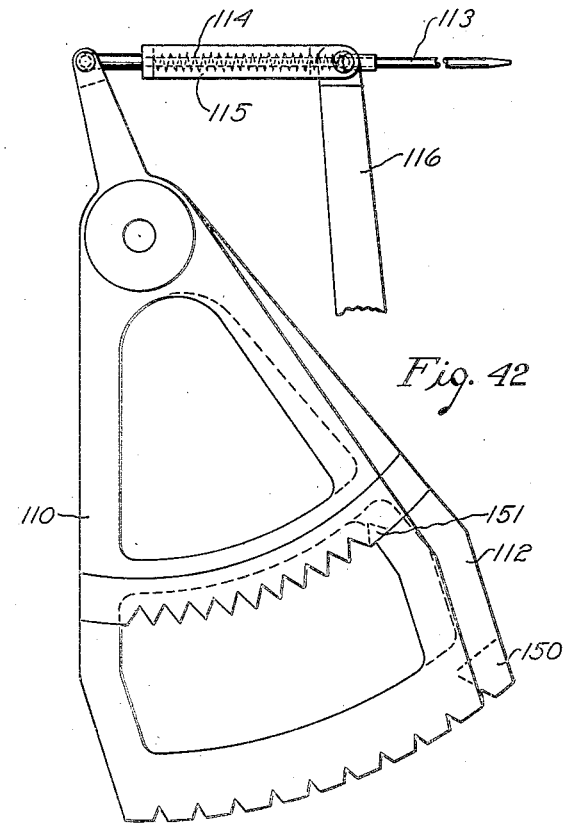
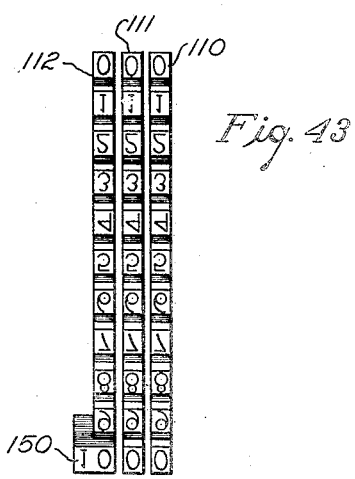
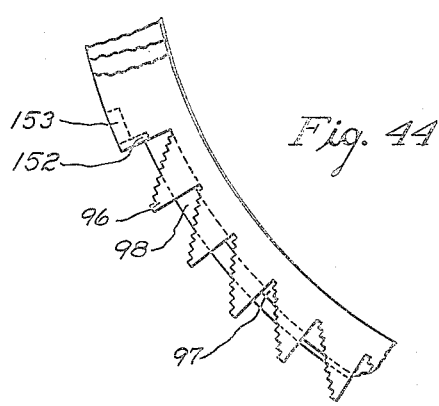
INVENTOR
George R. Wood
BY Cooper, Kerr & Dunham
his ATTORNEYS Patented Mar. 11, 1930

1,750,207

UNITED STATES PATENT OFFICE

GEORGE RUE WOOD, OF DAYTON, OHIO, ASSIGNOR, BY MESNE ASSIGNMENTS, TO DAYTON SCALE COMPANY, OF DAYTON, OHIO, A CORPORATION OF NEW JERSEY

RECORDING SCALE

Application filed March 16, 1922. Serial No. 544,174.

This invention relates to improvements in weighing scales and is more particularly directed to the provision of a suitable recording mechanism therefor to the general end that the weight of a load may be recorded.

In the weighing scale art many attempts have been made to provide for recording the weight of an applied load. This problem involves numerous difficulties and in general such recorders have usually either made the scale inaccurate in its weighing operations or they have been inaccurate in themselves in taking off the weight from the scale.

This present invention is directed to the provision of a recording weighing scale which will not only weigh accurately but also record accurately and to the provision of appurtenances and apparatus which meet the varying demands which are to be met in supplying a machine of this type.

Figs. 4 to 7 inclusive are detail views of the device for preventing the taking of a record until the scale has attained a position of equilibrium.

Fig. 8 is a detail showing certain other details of the interlock linkage.

Fig. 9 is a detail view of a capacity weight and associated switch device controlled by the adjustment thereof.

Fig. 10 is a rear view of the capacity electrically illuminated weight indicator.

Fig. 11 is a detail view of the capacity weight device, the adjusting devices therefor and the controlling connections to the type members.

Fig. 12 is a detail side elevation view of the pivotal weight indicator, the supplementary pointer and cooperating devices.

Fig. 13 is an expanded perspective view of certain of the parts shown in the preceding figure, Fig. 14 is a detail view of the locking means for the scale set element, here shown as a pivotal indicator.

Figure 15:
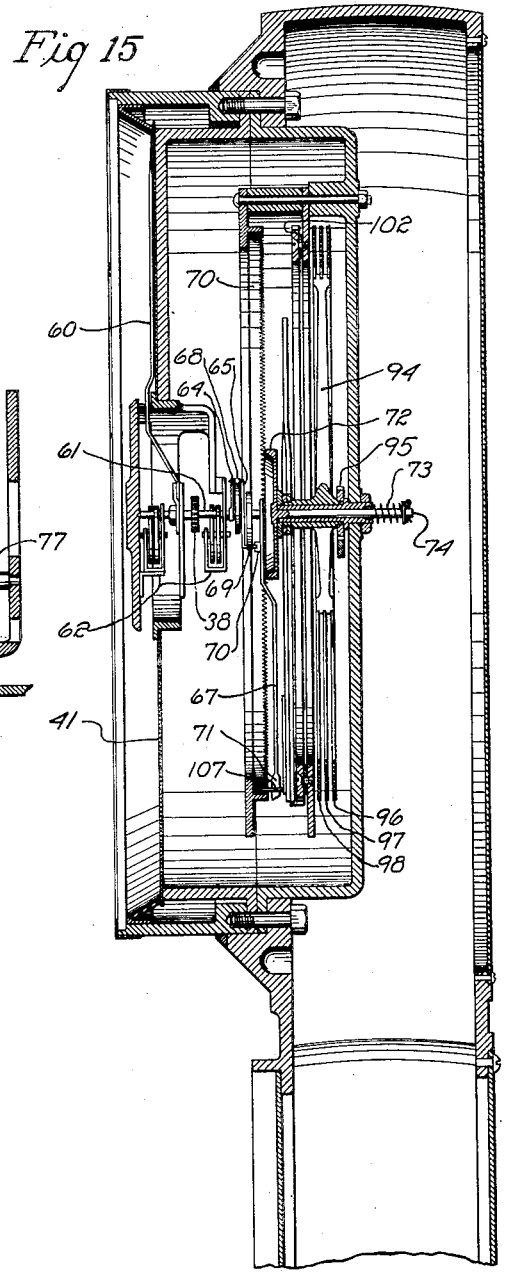

Fig. 15 is a vertical central view of the device with the scale beam and connections to the pinion removed.

Figure 16:
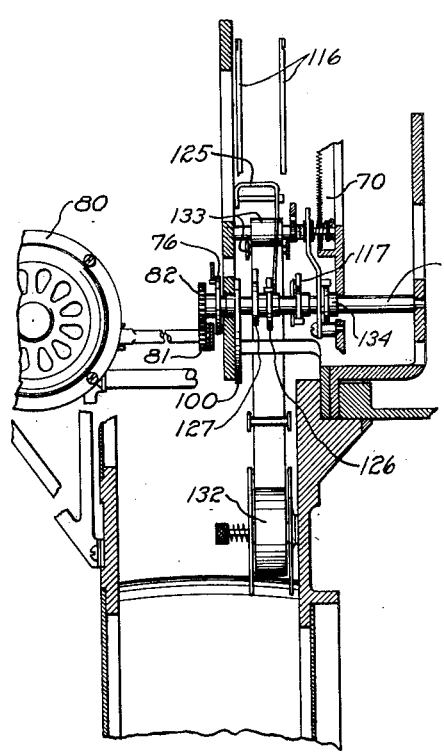

Fig. 16 is a vertical sectional view of the main cam shaft and the drive thereto to the motor.

Figs. 17 to 22 are details of the various cams shown in assembly in the foregoing figure.

Fig. 23 shows a detail of the push button or starting lever control and the control for the motor.

Figs. 24 and 25 are further details of the push button controls for the electric switch and motor gearing, the latter showing an operation in which the driving gears delay their enmeshment.

Fig. 26 shows a detail showing the means for feeding the ink ribbon from the starting lever.

Fig. 27 shows a detail side elevation of electric driving motor and its universally jointed drive shaft.

Fig. 28 is a side view of the scale looking from the type segment side with portions of the housing broken away to show the interior parts.

Fig. 29 shows a detail of the cam devices and parts which drive the follow up devices.

Fig. 30 shows a detail of the stepped discs and their sector controlling elements.

Figs. 31, 32 and 33 show the differential follow up devices which control the position of the stepped type segment controling discs in accordance with the position of the scale set stop.

Fig. 34 illustrates a detail of the type sectors and associated elements.

Fig. 35 shows details of the paper feed.

Fig. 36 shows details of the knife.

Fig. 37 shows an attachment adaptable for moistening a gummed surface of the check produced by the recording scale.

Figs. 38, 39 and 40 show a modified form of differential driving device.

Figs. 41 to 44 inclusive show details of the type sectors and particularly show an arrangement for printing amounts to one thousand pounds.

The scale to which the invention is herein shown applied is generally well known to the trade as an International #601 scale, and hence no detailed explanation of the same is necessary. It is to be understood that my improvements are also adapted for use in scales of other types and styles and that the illustrated embodiment represents only one and the preferred type of scale.

In general, the scale comprises a base housing 30, containing the usual base lever system, not shown, and supporting a platform 31. From the base levers a steelyard 32 extends to a main beam 33 (Fig. 2) fulcrumed upon the usual knife edge bearings. The applied load is automatically counterbalanced by a pendulum system comprising lower and upper pendulums 34 and 35 which are connected in the usual manner to the beam. To indicate the automatically counterbalanced load a suitable levered linkage 36 connects the beam with a rack 37 meshing with the usual pinion 38. Attached to the main scale beam is a tare beam 39 carrying a plurality of poises 40 instead of the single one heretofore employed.

Figure 2:
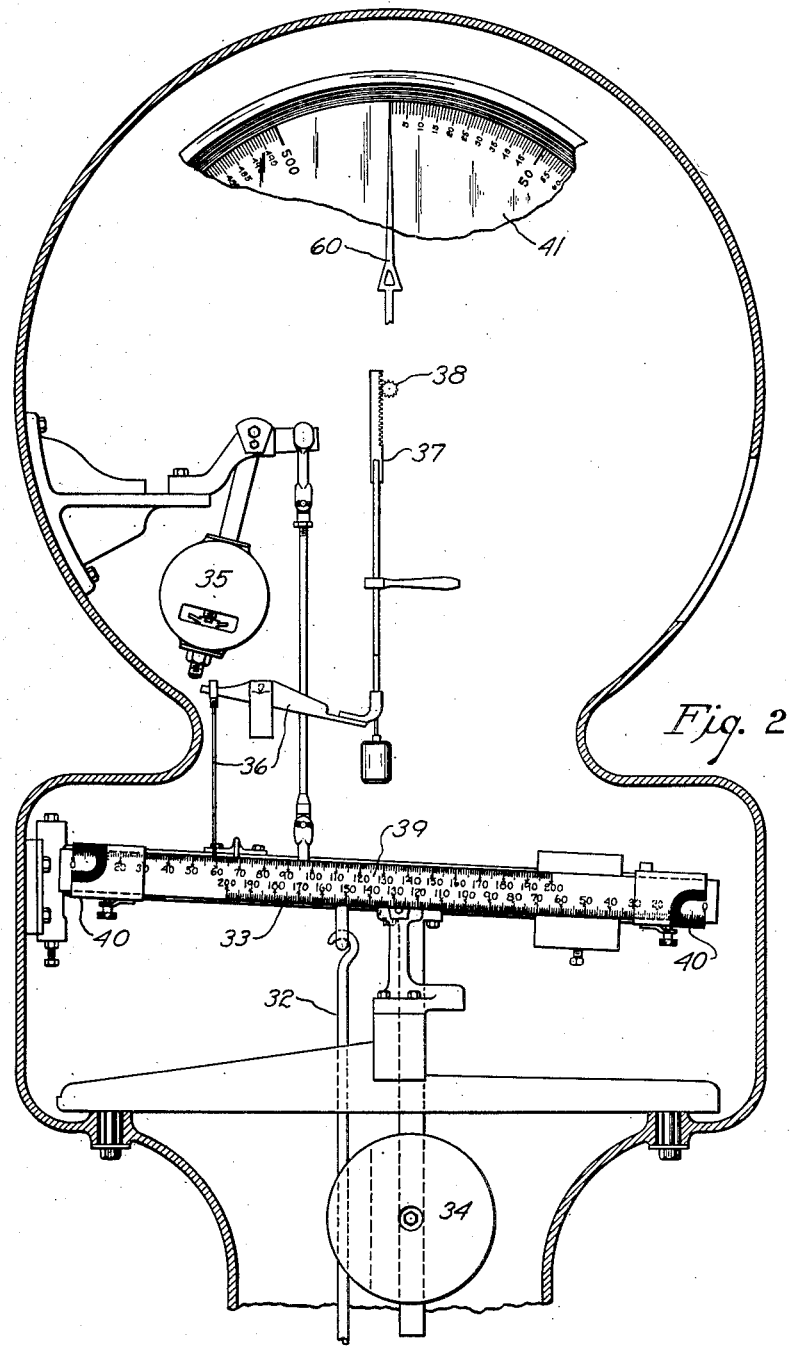
Fig. 2 is an enlarged view of certain of the interior parts which directly carry out the counterbalancing and weight indicating operations.

The scale is sealed at zero with the poises at opposite ends of the beam as shown in Fig. 2.

Figure 3:
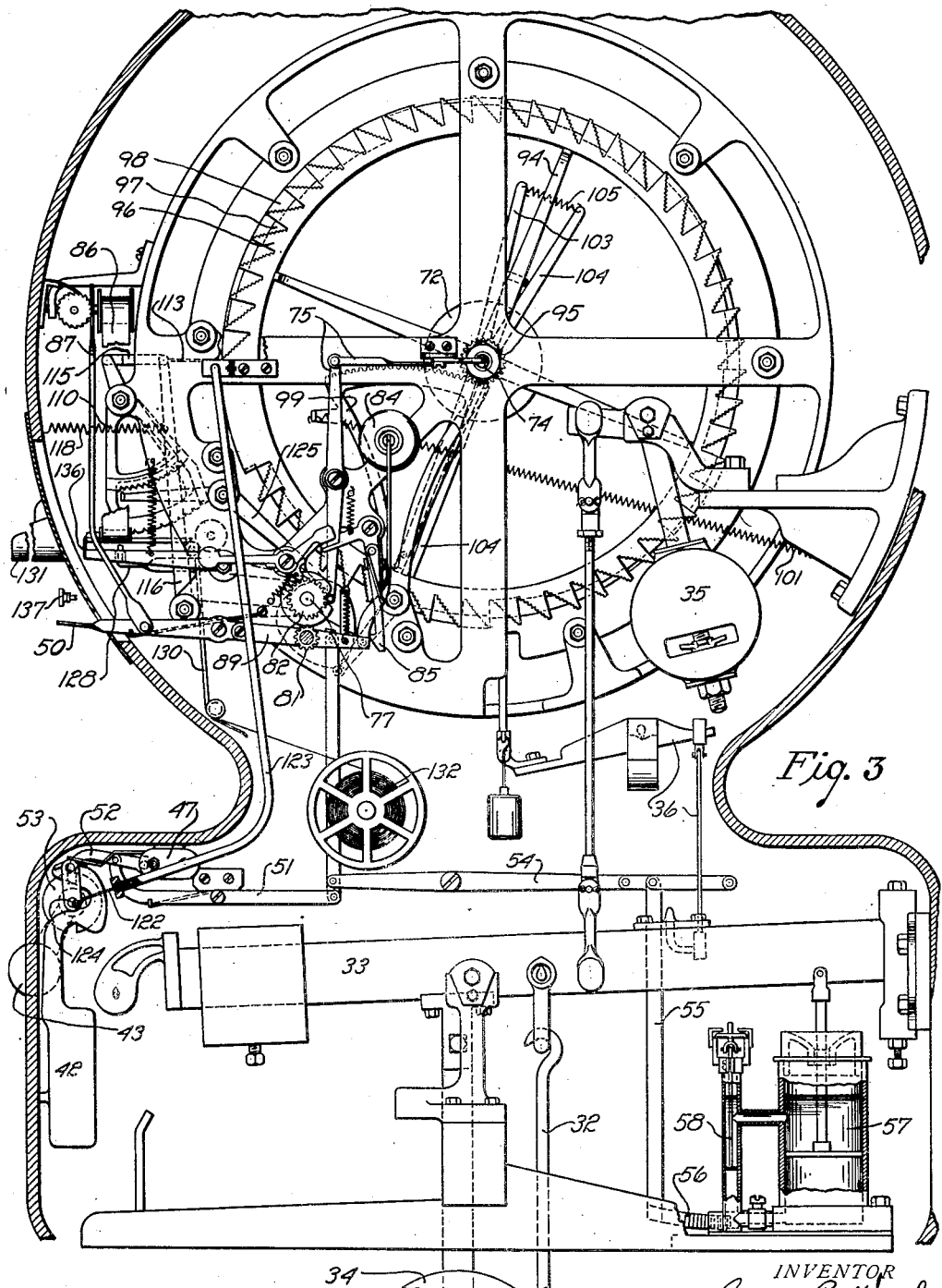
Fig. 3 is an enlarged rear view of the housing with the recorder parts shown therein in elevation.

The usual beam and dial housings are provided and within the latter is a graduated dial 41. When loads in excess of the dial capacity and the capacity of the automatic counterbalancing system are to be weighed, the capacity of the scale may be increased by means of a capacity weight 42 (Figs. 3, 9 and 11) which is deposited upon a beam pivot by rocking a handle 43 from the full to dotted line position (Fig. 11). Heretofore the indication of such excess capacity has been effected by means of a shutter which is mechanically displaced by the movement of the handle. In the present embodiment I have improved the indication by providing an opening 44 in the dial which is provided with glass screen 45 (Fig. 10) with weight indicating numbers preferably colored red. Behind the screen is an electric lamp 46 to which current is supplied through a suitable cable to a source, not shown. Control of the lamp illumination is secured by a switch device 47 (Fig. 9) which is normally opened and only closed when the handle is thrown to deposit a capacity weight. The capacity weight figures are normally invisible and only come to view upon the lighting of the lamp. If a plurality of capacity weights are used, I contemplate the provision of a plurality of screens of different colors and a plurality of lamps in compartments so that the illuminated screen would show the total capacity weights.

In devices of this character it is desirable to prevent the taking of a record until the capacity weight has been fully deposited upon the beam, and it is also preferable to prevent the taking of a record until the scale has reached a position of equilibrium. It is also desirable to prevent the shifting of the capacity weight handle when a record is being taken.

In Fig. 8, finger piece or button or starting lever 50 is manually depressed when a record is to be taken. This part is interconnected to a pivoted member 51 which is connected to a pawl 52 cooperating with a notched disc 53 carried upon the capacity weight handle shaft. With the parts as shown or with the capacity weight fully on, the starting lever may be depressed but not otherwise. The engagement of pawl 52 in the notch of disc 53 will also prevent the shifting of the capacity lever when the starting lever is depressed or in record taking condition. To prevent the starting of record taking until the scale has attained a position of equilibrium, the starting lever is interconnected to a link 54 (Fig. 8) which is interconnected to a bell crank member 55 having a serrated locking member 56 extending from its lower end, as shown in Figs. 5, 6 and 7. When the scale is out of equilibrium the beam is swinging to and fro and the main piston of the main scale dash pot 57 effects a surge of liquid in the dash pot and causes a supplementary piston 58 to be elevated or lowered thereby swinging fork locking member 59 (Fig. 7) into engagement with the serrated locking member 56. In this manner the depression of the starting lever is prevented until the piston of the main dash pot has entirely come to rest thereby allowing the fork locking member 59 to assume a mid position so as to interfere with the movement of the serrated locking member 56. For a fuller description of this locking device reference may be had to the patent of Fred G. L. Boyer, No. 1,449,162, dated March 20, 1923.

Figure 1:
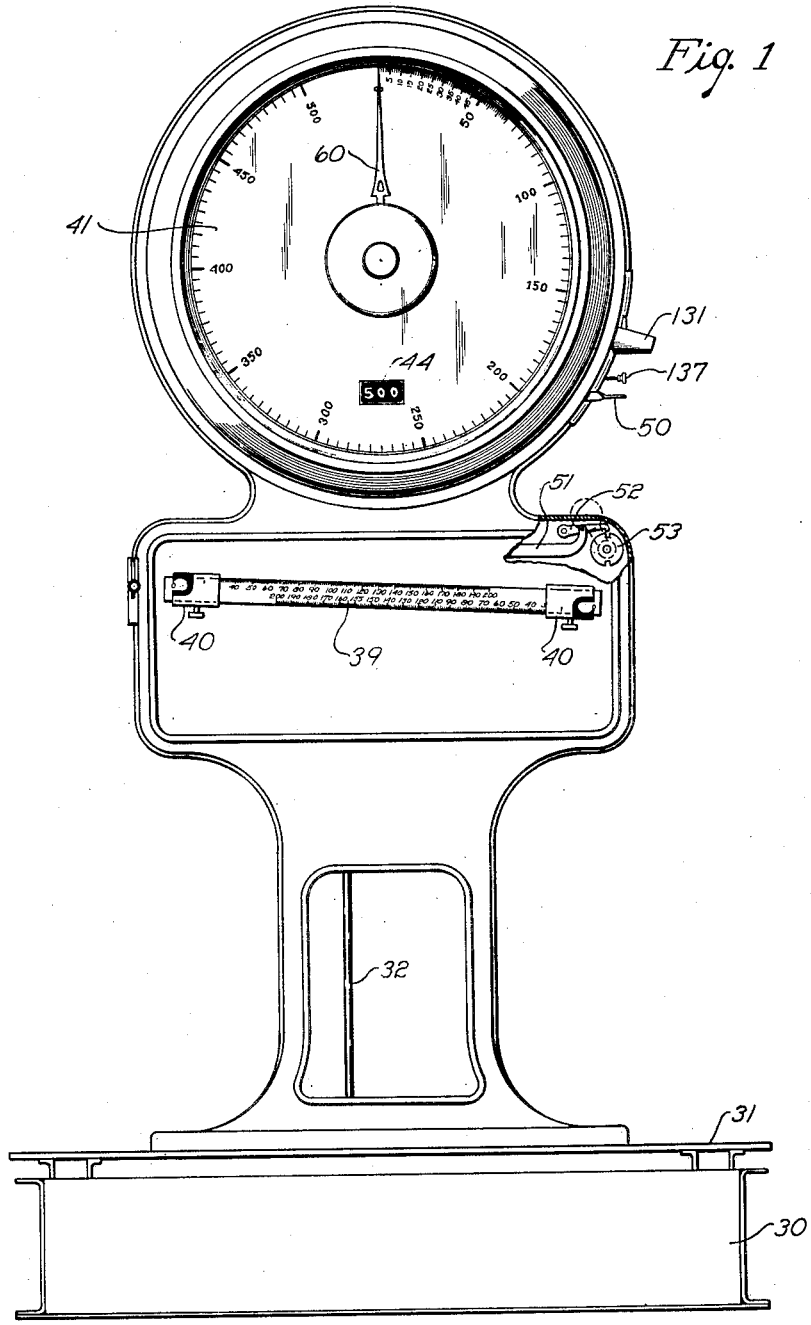
Fig. 1 is a front view of a scale embodying my improvements.

In the indicating devices, the automatically counterbalanced load is indicated upon dial 41 by means of a pivotal indicator 60 (Figs. 1 and 12). The pinion 38 for the pivotal indicator is mounted upon a suitable arbor or shaft 61 and supported upon the usual disc bearing 62 (see Fig. 12). It is from this shaft that the recording apparatus is controlled. In scales of this type it is found preferable to control the record-taking operations directly in accordance with the pointer rather than in accordance with some other scale part which may or not move in exact accordance with the position of the pointer. Such an action in a scale is due to pendulum effects in the various parts or angularity in the linkages of the pointer and to obtain an extremely accurate record of the weighing indicator a much better and accurate result may be secured by taking the rate reading from the pointer than from other parts. It is also desirable in a recording scale to permit the pointer device and interconnected scale parts to be displaceable during the taking of a record. If the scale set parts be positively locked the removal of a load from the platform would impose an excessive strain upon the operating parts of the scale which might damage same. Accordingly in the present invention I provide a yielding mechanism between the controlling means for the record-taking apparatus and the pivotal indicator. This yielding means is best shown in Fig. 13.

Referring to Fig. 13, the arbor 61 has rigidly fastened to it the indicator hand 60, the gear 38, and a hub 63 carrying an arm 64. Rotatably mounted upon the journal is a double armed member 65 and a hub 66 carrying a supplementary pointer or hand 67 which constitutes the scale set stop member for the recording devices and carries a lug 70. A coil spring 68 is fastened at one end to hub 63 and at the other to one of the arms 65. The tension of this spring normally keeps the end of arms 65 in contact with arm 64. A second spring 69 has its outer end fastened to the other arm of 65 and has its opposite end connected to the rotatable hub 66. The tension of this spring 69 keeps the extended end of the lower arm 65 in engagement with a lug 70 upon supplementary pointer. By this construction rotational movement of pointer 60 will cause an equal rotational movement to supplementary pointer of the so-called scale set stop 67, since the hands are coupled as it were by the tension springs 68, 69. However, if the supplementary pointer be restrained against movement, pointer 60 can be displaced in either direction since the coil springs yield to permit such displacement. If pointer 60 is turned clockwise spring 69 will be wound up. If turned anti-clockwise spring 68 will be wound up. This yielding connection permits the scale set stop to be locked without the imposing of excessive loads on the scale if the applied load is changed.

The foregoing description has described the scale and the parts set thereby. To effect the recording operation I provide power devices entirely independent of the scale to displace the parts in accordance with the position of the scale set stop element 67. The parts will now be described.

Referring to Fig. 15, the main housing is provided with suitable brackets to support an annular locking ring 70 (see also Fig. 12). The ring is provided with ratchet teeth which correspond in number to the number of unit graduations on the dial 41 with two extra notches to take care of zero printing and amounts over the capacity of the dial. In the present embodiment the dial is graduated to 500 pounds or by units and the ratchet is provided with 502 depressions. The bottom of each depression is in alignment with a small knife blade 71 carried by the supplementary pointer or scale set stop 67. If blade 71 be depressed into the ratchet teeth of 70, the pointer 60 will be aligned directly upon the graduation lines of dial 41. The ratchet will also serve as a lock for the scale set element 67. To effect such displacement and locking, a presser ring 72 is provided which is displaced to the left in Fig. 12 against the tension of a return spring 73 (Fig. 14). Such displacement is secured by the rocking of a bell crank shown in Fig. 14 against the stud 74 which carries the presser ring. The bell crank is rocked through a linkage 75 operated by a cam 76 (Fig. 23) on main cam shaft 77.

Referring to Figs. 16, 9 and 23, the driving motor 80 is mounted upon a suitable bracket at the rear of the machine and through a geared and universally jointed shaft drives a pinion 81 which is normally out of mesh with a rating pinion 82 on shaft. Depression of the starting button 50 (Figs. 8, 23, 24 and 25) through a link 83 actuates an electric switch 84 to supply motor 80 with current and engages the gears 81 and 82 and the starting lever is latched up by a pawl 85 (Fig. 23). It may be also mentioned that the ink ribbon 86 is fed forward by the depression of the push button by means of a link 87 (see Fig. 26). It is desirable to provide for a yielding engagement of gears 81, 82. For this purpose gear 81 is preferably connected to a supplementary lever 89 which is resiliently connected to the starting lever 50 as shown in Fig. 25. Pawl 85 cooperates with the lever 89. Cam shaft 77 is now rotated and almost immediately cam 76 will actuate the linkage 75 to operate the presser ring 72 to lock the scale set element in the manner previously explained. The interlocking devices heretofore described as being intercontrolled by the lever 50 also come into action and perform their respective functions.

The next operation consists in imparting a following up movement to a series of parts which control the recording operations and control the setting of the type members or sections. Referring to Fig. 14, the frame of the machine carries a hollow sleeve 93 within which the stud for actuating the presser ring 72 passes. Rotatably mounted upon this stud is a spider 94 having rigidly fastened thereto a pinion 95 and carrying a plurality of stepped discs 96, 97, 98 (see Fig. 30). Three of these discs are here shown; 96 being the units, 97 the tens and 98 the hundredths disc. To effect the rotation of the spider and thereafter restore it to normal position a sector 99 is provided (Fig. 29), which is provided with a follower cooperating with a heart-shaped cam 100 upon shaft 77. A suitable spring 101 keeps the follower in contact with the cam and advances the spider upon the rotation of the cam shaft. Restoration and retensioning of the spring is secured during the latter half of the cam cycle.

The taking off of the amounts is secured from the stepped wheels or discs and it is necessary that these parts be moved differentially in accordance with the position of displacement of the scale set stop element from zero.

Rigidly mounted with the spider 94 and rotating in unison therewith is a two armed member 103 having resiliently connected thereto by spring 105, a leading two arm member 104. An abutment limits the distance which the arms are apart. The lower end of the arm 104 rotates in advance of the arm 103 in the direction of the arrow and carries a yielding bell crank lever 106 thereon which is provided with a pin 107 which extends into the path of the knife edge 71. Upon member 104 is a pivoted pawl 108 which is interconnected by a small link 109 to the bell crank lever 106. This pawl is adapted to be swung from the position of Fig. 31 to the position shown in Fig. 32 and engage a tooth on member 102. This action occurs when the pin 107 contacts with the knife blade 71. Thereafter spring 105 yields and the end of arm 103 engages under the tail of pawl 108 and locks the same into engagement with the toothed disc 102. By the above described devices the differential arresting of the parts is secured without strain or shock since the bell crank 106 may yield relatively to 104 and this arm also yields relatively to arm 103 by reason of spring 105.

By the above described devices the stepped discs are displaced in proportion to the load upon the scale.

The next operation consists in setting the segments in accordance with the weight value of the stepped discs. Three of these type segments 110, 111 and 112 are provided which are pivotally mounted and provided with pins 113, which are suitably guided and are slidable into contact with the steps on the discs (see Figs. 30 and 34). The sectors are normally held in the blank position by springs 114 which abut shoulders upon the pins and against a bail 115. To set the type sectors, the bail is swung to the right (Fig. 34) by a bell crank 116 which is actuated by a cam 117 on cam shaft 77 (see Fig. 19). Restoration of the bell crank and bail is effected by spring 118.

By the above operations the type sectors 110, 111 and 112 which are for denominations of tens, units and hundreds will be set in accordance with the height of the steps on the discs to align the weight value at the printing point. The type sectors constitute one element of the printing couple.

When a capacity weight is applied it is necessary to advance the hundreds type sector an additional amount to cover the increase in the hundreds which is secured by the capacity weight. To provide for such operation the pin 113 cooperating with the hundredths stepped disc 98 is provided with a step 120 and is suitably slotted to provide a pin connection with a slide rod 121 which in turn connects to Bowden wire 122 or similar connection. By shifting the step 120 to the right, as shown in Fig. 30, the hundredths type sector will be advanced an extra number of positions corresponding to the value of the applied capacity weight. With a 500 lbs. automatic counterbalance scale with 500 lbs. offset by the capacity weight, this arrangement will permit the recording of all weights up to 1000 lbs. The Bowden wire 122 preferably extends through a suitable tube 123, and is eccentrically connected with the stud 124 on which the doubling or capacity weight handle controls the alignment of step 120 with disc 98 (see Figs. 11 and 30).

The next operation is to align the type segments. This is effected by a spring aligning pawl or liner 125 which is resiliently engaged with aligning teeth upon the sectors upon the proper displacement of cam 126 (see Figs. 34 and 20).

Thereafter cam 127 will have rotated sufficiently to permit the spring impelled platen carrying lever 128 to trip off and effect a printing of the weight value upon a paper strip or check. The platen constitutes the second element of the printing couple. The inking ribbon 86 which is of well known form passes across under the sectors at the printing point. In Fig. 26 the sectors are omitted but their position will be readily understood from Fig. 35. In this figure there is shown a chute 130 which leads from an aperture in the casing leading to a check receiving pocket 131 or shelf on the outside of the casing to a point adjacent a roll of paper 132. Rolls 133 constitutes the feed rolls for the paper strip within the chute and the cam 134 is timed to advance the paper directly after the platen 128 has impressed a record on the paper. Following the feeding of the paper cam 76 (Fig. 36) releases the spring actuated knife 136 and cuts off the end of the paper strip thereby forming a check which drops into the pocket 131.

In some cases it is desirable to record a plurality of successive weighings upon one check or upon a continuous strip. For this purpose means is provided for preventing the knife operation. In Fig. 36 a supplementary button 137 is provided which when pulled out swings a lever 138 and thereby swings the knife 136 to inoperative position.

In Fig. 37 a moistening attachment is shown comprising a pair of rolls 140, the lower of which rotates in a water receptacle. Drive for these rolls may be secured in any desired manner, as by chain 141 from rolls 133. By the use of this attachment the lower roll 140 automatically moistens a gummed surface of the check as it is fed out of the machine, so that the check can be immediately applied like a gummed stamp to the article which has been weighed.

In the modified form of differential drive shown in Figs. 38 to 40, inclusive, the spring 101 (Fig. 29) is eliminated. Positioning of the parts is secured in a positive manner. Sector 99 is driven from a cam 100 and through pinion 95 turns a disc 145 (Fig. 38). This disc is provided with a notch 146 and a shoulder 147. Arm 103 carries a dog 148 adapted to engage the tail of pawl 108 and lift a spring pressed detent rod 149 out of notch 146 in disc 145. Thereafter the parts 95—145, etc., which move with sector 99 can move to an advanced position (see Fig. 38). The arms 104—103 will be locked as before, the pawl 108 being locked by dog 148 instead of directly by arm 103 as heretofore. Upon the retrograde movement of disc 145, shoulder 147 will engage bracket of rod 149 and swing the dog 148 to disengaged position as shown in Fig. 39. Thereafter the rod 149 will recognize notch 146 and the differential devices will be restored to zero.

Frequently in weighting operations it is desirable to record tare. This is secured by the use of the double tare poises shown in Fig. 1, together with the knife throw off devices of Fig. 36.

To record gross weights the poises 40 are left in the position shown in Fig. 1.

To record net weight, the left hand poise 40 is moved out sufficiently to compensate for the tare weight.

To record tare alone, the left hand poise is first moved to compensate for tare, the scale is then unloaded and the right hand poise 40 moved to the left to a corresponding tare weight indicating position as shown on the lower scale of beam 39. The left hand poise 40 is then returned to zero and the starting lever 50 depressed, thereby recording the tare weight alone on the check.

By suitably manipulating the poises and the knife throw off device 137, tare, net and gross weights may be recorded on a single check.

Figs. 41 to 44 show an embodiment of the invention in which capacities to 1000 lbs. can be taken care of. In Figs. 41 to 43 inclusive it will be seen that hundreds type sector 112 is provided with a supplementary type figure 150 representing 10. The corresponding aligning notch 151 is also provided. The hundreds disc 98 is provided with a last step 152 and this step 152 represents 5 in the hundreds series. The parts are so arranged that when the step 120 on the type pin 113 of the hundreds series intercepts step 152 on disc 98 the type segment will record ten. If, on the other hand, the applied load on the scale is more than the capacity of 1000 lbs., a supplementary lug 153 projecting from the side of disc 98 will intercept the long step of the stepped pin 113 and zero will be recorded. As shown in Fig. 44 the lug 153 is placed directly after the last graduation step 152 and in which case only used when the capacity weight is used. Otherwise 500 lbs. would be recorded when 1001 lbs. were on the scale platform.

What I claim is:

1. In a weighing scale, in combination, means for automatically counter-balancing the applied load, a capacity weight device for increasing the counter-balance effect, recording devices for recording applied loads, and means for controlling said recording devices, said means being settable in set positions corresponding to applied loads and having a portion thereof settable under the control of both said automatic counter-balancing means and said capacity weight device, said portion being capable of positioning a related portion of said recording devices for recordation of applied loads.

2. In a weighing scale, in combination with a scale element, a capacity weight, means for applying said weight to a movable part of said scale, recording devices including a type segment and means for controlling the position of the same by the position of said scale element, and means controlled by the capacity weight applying devices for displacing the type segment an additional distance when the capacity weight is applied.

3. In a weighing scale having in combination a main scale beam, tare devices associated therewith having provisions for displacing the scale beam from zero position in accordance with tare and also having provisions for permitting said beam to be displaced in accordance with net weight, means controlled by said beam for printing tare weight and net weight.

4. In a weighing scale having in combination a main scale beam, tare devices associated therewith having provisions for permitting the displacement of the beam from zero position in accordance with gross weight and also having provisions for themselves effecting a displacement of the main scale beam in accordance with the tare weight, printing devices controlled by the main beam for printing gross and tare weights.

5. In a weighing scale having in combination, a main beam, tare devices associated therewith with provisions for correcting the displacement of the main beam to directly show net weight, said tare device being adapted to permit the deflection of said beam to show gross weight or to deflect the beam to directly show tare weight, and means controlled by said main beam for recording net, tare and gross weights.

6. In a recording scale, in combination, a counter-balanced main scale beam, a tare beam associated therewith, means for recording applied loads, means for adjusting said scale to permit the recording of tare comprising a plurality of poises upon the tare beam, one of which is adapted to be displaced to off-set the tare, and a second of which is adapted to be displaced to display the scale parts to an extent proportional to the tare which has previously been determined whereby the tare weight may be recorded by the recording device.

7. In a weighing scale having in combination, a main beam and a recording device controlled thereby, tare devices associated with the main beam, said devices including means for displacing the said beam proportionally to tare, whereby said tare may be recorded by said recording device.

8. In a weighing scale having in combination a main scale beam, tare devices associated with the main beam, said devices including means for displacing the main beam from zero position in accordance with tare, and printing means controlled by the main beam for recording tare and net weight.

9. In a recording weighing scale having in combination with movable scale parts, a capacity weight and means for applying the same to one of the movable parts of said scale to increase the weighing capacity thereof, means for recording applied loads as offset by the scale with or without the capacity weight, and means for preventing the application of a capacity weight during a recording operation to prevent the making of an erroneous record of the weight of the applied load.

10. In a weighing scale having in combination load offsetting mechanism including capacity weight means for increasing the load offsetting capacity of the scale, a recording device for recording applied loads however offset, means for shifting the capacity weight means to on or off position, and means for preventing a weight recording operation except when the aforesaid means is in on or off position.

11. A weighing scale having a displaceable scale element in combination with a recording device for recording applied loads, a device for increasing the capacity of the scale and means for shifting the same into or out of cooperation with the scale element, means for initiating a recording operation, and means controlled by the aforesaid means for locking the capacity device shifting means.

12. In a weighing scale, in combination, automatic load counterbalancing means, and capacity weight means adapted to increase the load offsetting characteristics of the scale, a recording device for recording the entire offset load and means for positioning a single element of the recording device under the conjoint control of the automatic load counterbalancing means and said capacity weight means.

13. In a weighing scale having load offsetting devices including a capacity weight and and means for applying the same, recording devices for recording the applied load offset by said load offsetting devices, and means controlled by the capacity weight devices for preventing the recording operation when the capacity weight is being applied to the scale.

14. In a weighing scale including a capacity weight and means for applying the same, recording devices for recording the applied load including the load offset by the capacity weight, and means associated with the recording devices for preventing the shifting of the capacity weight during recording operations.

15. In a recording scale, in combination, a pivotal member, means for displacing the same in accordance with the applied loads, a supplementary pivotal member correspondingly angularly displaceable, a locking means therefor comprising a toothed annular member, and means for pressing the supplementary pointer in engagement therewith.

16. In an indicating and recording scale, means for indicating an applied load and controlling a recording device in accordance with the load indicated comprising, a scale set pivotal indicator, a graduated dial therefor, a supplementary member adapted to swing pivotally in accordance with the displacement of the indicator, a toothed annular member adjacent said supplementary member, said toothed portions corresponding to the graduations upon said dial, and a presser device for bringing the supplementary member into contact with the toothed annular member to thereby align both the supplementary and main pivotal indicator at the nearest graduation line on the dial.

17. A weighing scale including in combination, a capacity weight and means for applying the same, means for visually indicating the weight value of the applied capacity weight comprising an electric illuminated screen with suitable numbers thereon, and circuit closer means therefor operated by the capacity weight applying means.

18. A weighing scale including a dial, a pivotal indicator therefor, an automatic counterbalance, means for offsetting loads in excess of the dial capacity and the capacity of the automatic counterbalance comprising a capacity weight device and means for operating the same, means for indicating the amount of loads thus offset by the capacity weight comprising, a numeral screen in the dial of the scale, means for electrically illuminating the same, and means controlled by the capacity weight operating means for controlling the said illuminating means.

19. In a weighing scale having a capacity weight and means for applying the same, recording devices for recording the applied load, and locking means for preventing automatically the recording operation when the capacity weight is being applied to the scale.

20. In a weighing scale having a capacity weight and means for applying the same, recording devices for recording the applied load, and locking means automatically operative during recording for preventing the shifting of the capacity weight during recording operations.

21. In a weighing scale having a capacity weight and means for applying the same to the scale, recording devices for recording the applied loads, and locking means for locking the recording devices against operation except when the capacity weight is in entirely "off" or "on" position.

22. In a weighing scale having a capacity weight and means for applying the same to the scale, record-taking means for recording applied loads, means for automatically preventing record-taking when the capacity weight is being applied to the scale and means for automatically preventing the shifting of the capacity weight when record-taking has been initiated.

23. In a weighing scale having a capacity weight and means for applying the same to the scale, recording devices for recording the applied loads including the load offset by the capacity weight device, and means controlled by the capacity weight devices for preventing the recording operation except when the capacity weight is in entirely "off" or "on" position.

24. In a weighing scale having load offsetting mechanism, said mechanism including a capacity weight and means for applying the same to the scale, record-taking means for recording offset loads, means controlled by the capacity weight devices for preventing record-taking when the capacity weight is being applied to the scale, and means controlled by the record-taking mechanism for preventing the shifting of the capacity weight when record-taking has been initiated.

25. In combination, a weighing scale, means controlled thereby for recording the weight indications of said scale, means for varying the capacity of said scale, said means including provisions for varying the weight indications of said scale and the corresponding records, and means controlled by the recording means for preventing operation of said last named means while recording is being effected.

26. In combination, a weighing scale, means controlled thereby for recording the weight indications of said scale, means for varying the capacity of said scale, means associated with said last named means for varying the weight indications of said scale and of the records derived therefrom, means controlled by the recording means for preventing operation of said capacity varying means while recording is being effected, and means controlled by the capacity varying mechanism for preventing operation of said recording means while the capacity of the scale is being varied.

27. In combination, a weighing scale, means controlled thereby for recording the weight indications of said scale, means for varying the capacity of said scale, and means controlled by said recording means for preventing operation of said last named means while recording is being effected.

28. In combination, a weighing scale, means controlled thereby for recording the weight indications of said scale, means for varying the capacity of said scale, means controlled by said recording means for preventing operation of said last named means while recording is being effected, and means controlled by the capacity varying means for preventing operation of said recording means while the capacity of the scale is being varied.

29. In combination, a weighing scale, means controlled thereby for recording the weight indications of said scale, means for varying the capacity of said scale, and means controlled by said capacity varying means for preventing operation of said recording means while the capacity of said scale is being varied.

30. The combination with a weighing scale having a weight indicating element, of a movable member, means for automatically positioning said member in accordance with the position of said element but permitting independent movement of said element when said member is held, means operable only after said element has come to rest for holding said member in set position, recording devices, and means controlled by said member for setting said recording devices.

31. The combination with a weighing scale having weight-indicating means including a movable element, of a movable member, connecting means between said element and member for positioning said member in accordance with the position of said element but permitting independent movement of said element, means operable after said element has come to rest for holding said member in a position corresponding to the then nearest calibration of said weight indicating means, recording devices, and means controlled by said member for setting said recording devices.

32. The combination with a weighing scale having weight-indicating means including movable element, of a movable member, connecting means between said element and member for positioning said member in accordance with the position of said element but permitting independent movement of said element, means operable after said element has come to rest for holding said member in a position corresponding to the then nearest calibration of said weight-indicating means, recording devices, and means, including power-actuated follow-up mechanism, controlled by said member for setting said recording devices.

33. In combination, a weighing scale, means controlled thereby for recording the weight indications of said scale, means for varying the capacity of said scale, said means including means for varying the corresponding weight indications and records, and means controlled by said capacity varying means for preventing operation of said recording means while the capacity of said scale is being varied.

34. In a recording scale having displaceable parts, an electric motor for effecting recording operations and a key member for initiating the operation thereof in combination with means controlled by said displaceable parts for preventing the initiation of operations of the motor by the actuation of said key until the displaceable parts of the scale have ceased movement.

35. In a recording scale having displaceable parts movable to and fro and assuming a final position of equilibrium, an electric motor for effecting recording operations, a key member connecting said motor to a source of current, and means controlled by the to and fro movement of the said displaceable parts for preventing the effective actuation of said key member.

36. In a recording scale having displaceable parts movable to and fro and assuming a final position of equilibrium, recording mechanism for recording the weight in accordance with the displacement of said parts, an electric motor for driving said recording mechanism, a manipulative member for coupling said motor with said recording mechanism, and means operable during the to and fro movement of the said displaceable parts for preventing the coupling of said motor to said recording mechanism.

37. In a recording scale having displaceable parts movable to and fro and assuming a final position of equilibrium, recording devices for recording the weight as determined by the position of said displaceable parts, a motor for driving said recording mechanism, a manipulative member for connecting said motor to a source of current and for also coupling said motor to the recording mechanism, and means operable during the to and fro movement of the said displaceable parts for preventing the coupling operation and the connecting of the motor to a source of current.

38. In a recording scale in combination with recording devices, a motor for driving the same, means for connecting the motor and driving devices and for placing said motor in circuit with a source of current, and locking means for the aforesaid means comprising a linkage and locking mechanism therefor, a dash pot connected to said scale, and means operative upon movement of fluid in said dash pot for controlling the aforesaid mechanism.

39. In a weighing scale, the combination comprising, load offsetting mechanism including a removable capacity weight, means for changing the relation of and capacity weight to said load offsetting mechanism, recording devices for recording an applied load, and locking means operative during a recording operation to maintain said capacity weight in a fixed position as predetermined at the time of initiation of a recording operation.

40. In a weighing scale, the combination comprising, load offsetting mechanism including a removable capacity weight, recording mechanism for recording an applied load, means for changing the relation of said capacity weight to said load offsetting mechanism, and locking means operative while a change is taking place in the relation of said capacity weight to said load offsetting mechanism to maintain said recording mechanism ineffective for recording purposes.

In testimony whereof I hereto affix my signature.

GEORGE RUE WOOD.